United States Patent
Loveland et al.

(10) Patent No.: US 7,287,056 B2
(45) Date of Patent: Oct. 23, 2007

(54) DISPATCHING NOTIFICATION TO A DEVICE BASED ON THE CURRENT CONTEXT OF A USER WITH THE DEVICE

(75) Inventors: Shawn Dominic Loveland, Sammamish, WA (US); Jorg-Thomas Pfenning, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 09/966,685

(22) Filed: Sep. 28, 2001

(65) Prior Publication Data

US 2003/0065790 A1    Apr. 3, 2003

(51) Int. Cl.
G06F 15/16    (2006.01)
G06F 7/00    (2006.01)
H04M 15/00    (2006.01)

(52) U.S. Cl. .............. 709/206; 709/207; 379/211.01; 707/102

(58) Field of Classification Search ............... 709/206; 340/531; 455/41; 713/169
See application file for complete search history.

(56) References Cited

U.S. PATENT DOCUMENTS

| | | | |
|---|---|---|---|
| 6,275,957 B1 | 8/2001 | Novik et al. ................. 714/39 |
| 6,463,462 B1* | 10/2002 | Smith et al. ................ 709/206 |
| 6,671,508 B1* | 12/2003 | Mitsuoka et al. ......... 455/412.1 |
| 2002/0002678 A1* | 1/2002 | Chow et al. ................ 713/169 |
| 2002/0022453 A1* | 2/2002 | Balog et al. .................. 455/41 |
| 2002/0073158 A1* | 6/2002 | Dalal et al. ................. 709/206 |
| 2002/0085701 A1* | 7/2002 | Parsons et al. ......... 379/211.01 |
| 2002/0118798 A1* | 8/2002 | Langhart et al. ........... 379/67.1 |
| 2002/0123329 A1* | 9/2002 | Murray ....................... 455/414 |
| 2002/0177428 A1* | 11/2002 | Menard et al. ............. 455/404 |
| 2003/0018692 A1* | 1/2003 | Ebling et al. .............. 709/108 |

(Continued)

FOREIGN PATENT DOCUMENTS

WO    WO 01/69287    9/2001

OTHER PUBLICATIONS

Title: Nomadic Radio: speech and audio interaction for contextual messaging in nomadic environments Author Sawhney, N.; Schmandt, C. Journal: ACM Transactions on Computer-Human Interaction vol. 7, No. 3 p. 353-83 Publication Date: Sep. 2000 Country of Publication: USA.

(Continued)

Primary Examiner—Wen-Tai Lin
(74) Attorney, Agent, or Firm—Workman Nydegger

(57) ABSTRACT

After detecting that an event occurs for which notification is desired, a notification service determines an appropriate way to notify the user given the user's current circumstances. The notification service determines the appropriate notification method by accessing context information for the user (e.g., whether the user's telephone is on, busy, in hands-free mode, in meeting mode, or the like). The notification service then accesses a set of rules from which the appropriate notification method may be determined based on the current circumstances of the user. These rules may be, for example, default rules or may be set of the user. The notification service then causes the notification to be sent to the user using the appropriate notification method. The notification methods include voice notifications in which the notification is read to the user.

28 Claims, 3 Drawing Sheets

U.S. PATENT DOCUMENTS

2003/0023690 A1* 1/2003 Lohtia .................. 709/206
2003/0058096 A1* 3/2003 Shteyn .................. 340/531
2003/0126216 A1* 7/2003 Avila et a. .............. 709/206
2005/0103767 A1* 5/2005 Kainec et al. .......... 219/130.5
2005/0207544 A1* 9/2005 Liu et al. .............. 379/88.17
2006/0036642 A1* 2/2006 Horvitz et al. .......... 707/102

OTHER PUBLICATIONS

Title: The computer voices alarm Author Kuroda, T. Conference Title: Official Proceedings of International Speech Tech '87: Voice Input/Output Applications Show and Conference p. 76-81 Publication Date: 1987 Country of Publication: USA 260 pp.

* cited by examiner

DISPATCHING NOTIFICATION TO A DEVICE BASED ON THE CURRENT CONTEXT OF A USER WITH THE DEVICE

BACKGROUND OF THE INVENTION

1. The Field of the Invention

The present invention relates to methods, systems and computer program products for notifying a user of an event via voice notifications or other notification methods depending on the user's dynamic circumstances.

2. Background and Related Art

Access to relevant information is essential to the decision making process. Computer networks such as the Internet have revolutionized the way people access information. For example, when using an Internet-enabled computing device, one can access information on an almost unlimited variety of subjects. The proliferation of such computing devices has resulted in this modem era being often termed "the information age". Conventional information searches are "synchronous" in that one obtains the information only after a synchronous request for the information.

Often, it is desirable to know immediately when something occurs, without having to navigate to the information source, and without having to make a synchronous request for the information. This is possible using conventional notification technology. Notification technology involves a user subscribing to notifications regarding a certain event. Later, if the event occurs, a notification is dispatched to the user indicating that the event occurred. Notification technology is useful when a user is interested in knowing of a certain event in a timely manner, without having to constantly navigate to the information source at frequent intervals.

There are a variety of conventional notification techniques, typically involving some form of visual notification. For example, when using a telephone network to send a notification to a mobile device, a notification may take the form of one or more related Short Text Message (SMS) messages. This notification may include text information that typically represents information regarding the event. Another type of notification is the Wireless Application Protocol (WAP) HyperText Markup Language (HTML) text push notification, which may also be used to send text notifications, as welt as corresponding layout information, to mobile devices.

Often, certain notification techniques may be less appropriate depending on the user's circumstances. For example, if a user is driving a car, it may be less effective to simply display a text notification assembled from SMS messages. Viewing the notification would require that the user turn his attention from driving. In that case, speaking the notification may be the most appropriate notification method. Therefore, what are desired are methods, systems, and computer program products for notifying a user via voice notifications, or other notifications as appropriate for the user's circumstances.

SUMMARY OF THE INVENTION

Methods, systems, and computer program products are described that notify users of events in a manner that is appropriate considering the current circumstances of the user. This notification may involve voice notifications.

For example, the user may be driving a car with the user's telephone in a hands-free cradle. In that case, it may be inappropriate to send an urgent notification via text message as the user may be distracted from driving if the user has to visibly read the text message. Furthermore, should the user want to perform an action in response to the notification (e.g., asking for the full text of an e-mail when notified of an important e-mail), the user might be tempted to visually navigate to the desired action and select that action, thus further distracting the user. On the other hand, it may be far more appropriate, if the telephone is in the hands-free cradle, to have the notification spoken to the user via a voice notification, and to allow the user to act on the voice notification by speaking a desired response action.

After detecting that an event occurred for which notification is desired, a notification service determines an appropriate way to notify the user given the user's current circumstances. The notification service determines the appropriate notification method by accessing context information for the user (e.g., whether the user's telephone is on, busy, in hands-free mode, in meeting mode, or the like). The notification service then accesses a set of rules from which the appropriate notification method may be determined based on the current circumstances of the user. These rules may be, for example, default rules and/or may be set by the user. For example, a default setting may be that if the user's telephone is on, but busy, that the notification be sent to the telephone as a text message so as not to interrupt the user during a telephone call. However, the user may specify that if an e-mail is received from a certain important person, that a voice notification interrupt the current conversation even if the user is currently on the telephone. The notification service then causes the notification to be sent to the user using the appropriate notification method.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems and computer program products for facilitating voice notification methods and other notification methods as appropriate considering a user's dynamically changing circumstances. The notification process begins when an event occurs that requires notification. For example, a user may have previously subscribed to notifications regarding the event. The user's current context is then accessed to determine the best method to use in notifying the user. For example, if the user is driving a car with the telephone in hands-free mode, the user may be notified via an audible voice notification through the hands-free telephone. If the user is in front of a personal computer, the notification may take the form of an instant message. The rules for how and whether to notify an individual given a certain situation may be set by the user.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
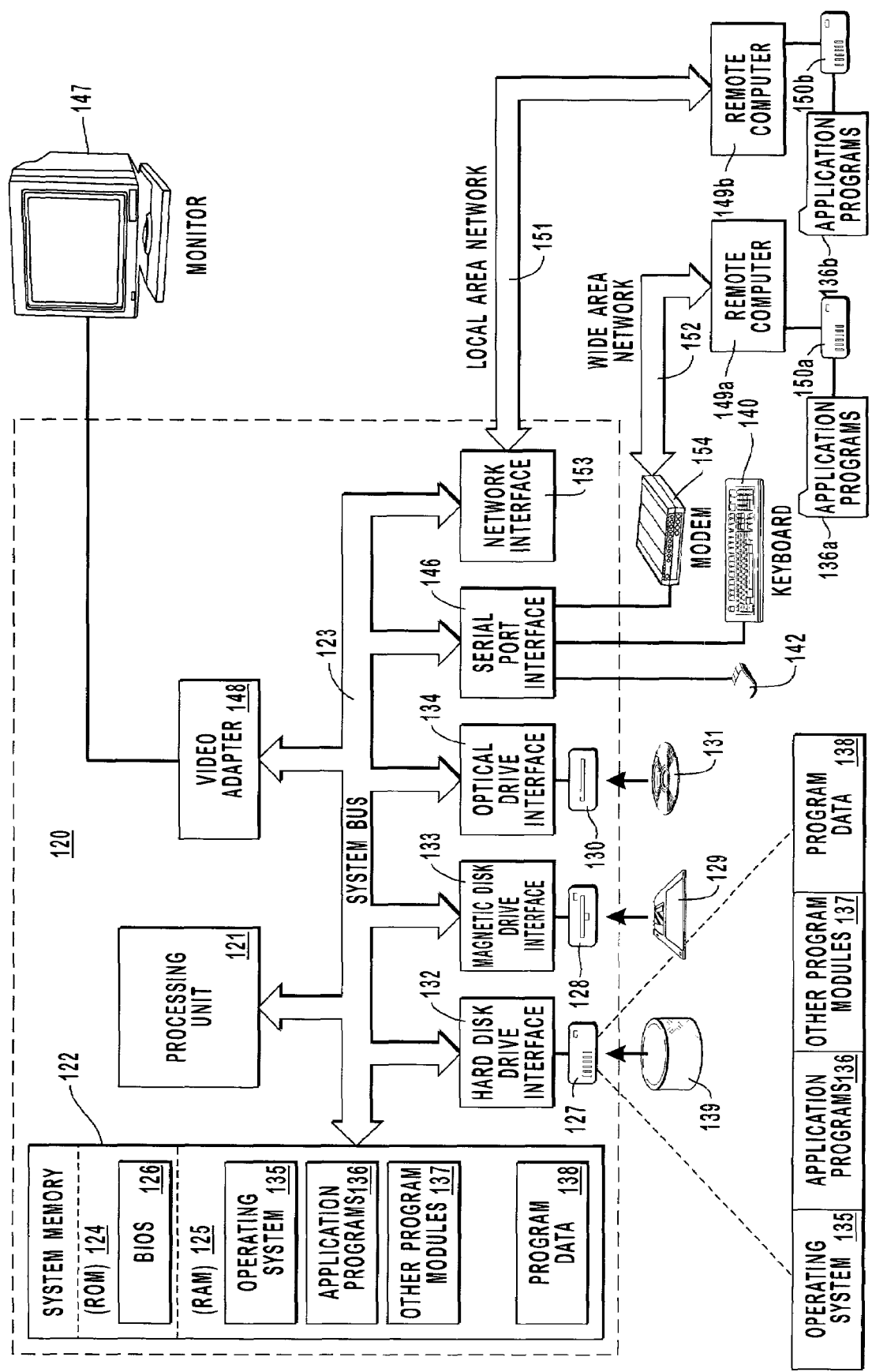
FIG. 1 illustrates an example computing system that may implement the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Figure 2:
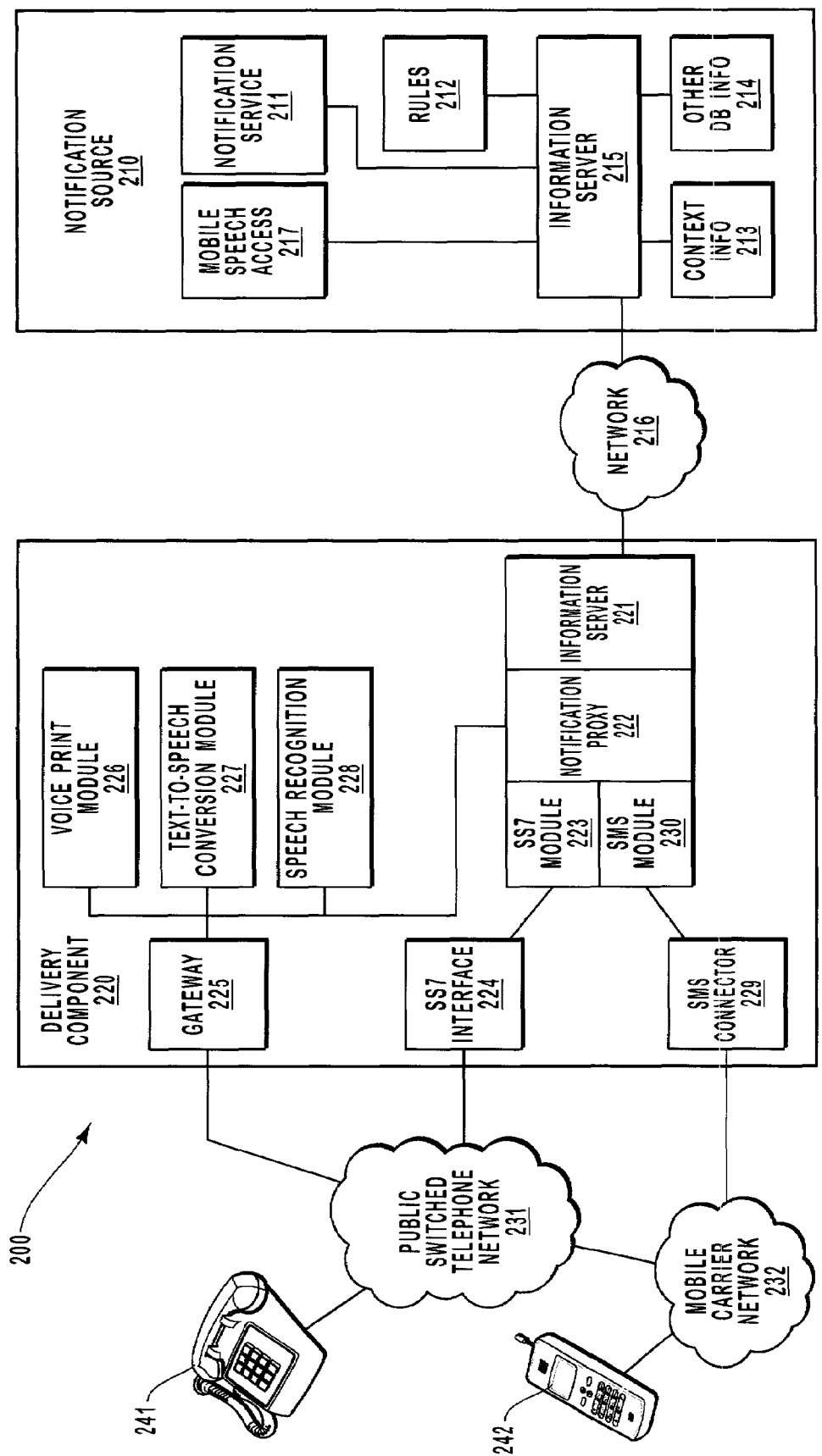
FIG. 2 illustrates a suitable network environment in which the present invention may operate.
Figure 3:
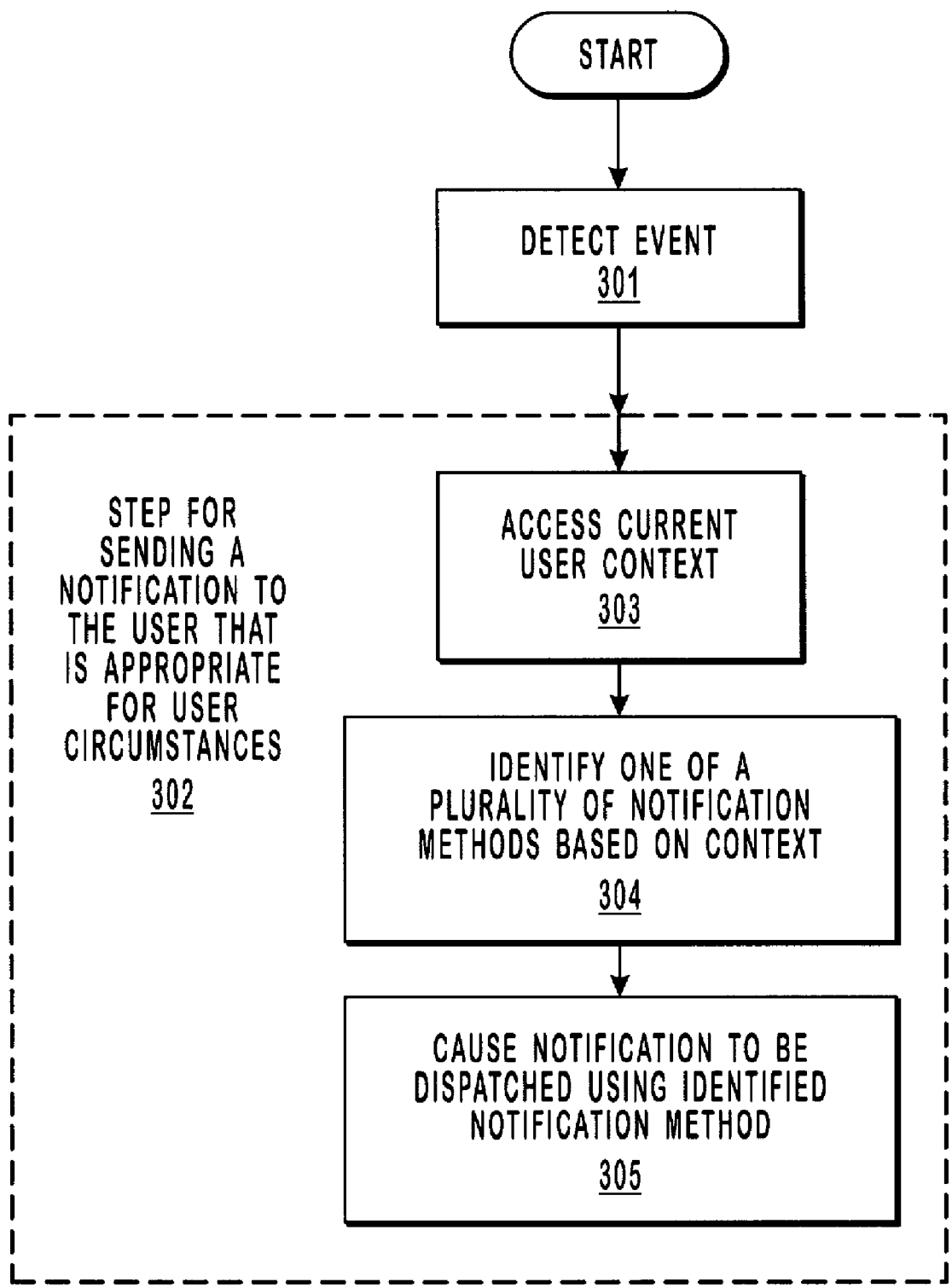
FIG. 3 illustrates a flowchart of a method for notifying a user of an event in a context sensitive manner that takes into consideration the user's current state.

FIG. 2 illustrates an example environment 200 in which the present invention may be implemented. FIG. 3 illustrates a method in accordance with the present invention for notifying a user of an event in a context sensitive manner that takes into consideration the user's current state. FIGS. 2 and 3 will be described with frequent reference to each other.

Referring to FIG. 2, the example environment 200 includes several devices that are capable of receiving notifications such as telephonic devices 241 and 242. The environment 200 also includes a notification source 210 that generates the notification either in response to having directly detected an event, or in response to having indirectly detected an event via another notification that may be received by the notification source 210. In addition, the environment 200 includes a delivery component 220 that delivers the notification using the correct notification method to the user of the corresponding telephonic device 241 or 242.

The notification source 210 may be, for example, an enterprise that manages information or that may detect events that the user is interested in. For example, the notification source 210 may be an e-mail, news, and/or stock quote server. The delivery component 220 is responsible for delivering the notification using the proper method and may be, for example, incorporated in a carrier network.

Although the notification source 210 and the delivery component 220 are illustrated as distinct components separated by a network 216, the notification source 210 and the delivery component 220 may, in fact, be at least partially integrated. In other words, at least some of the functionality described below as being performed by the delivery component 220 may be performed instead by the notification source 210, and vice versa. In addition, although the delivery component 220 is described as an integrated component, the functionality of the delivery component 220 may be distributed over a network. The notification source 210 may also be distributed.

The notification source 210 includes a notification service 211 that directly or indirectly detects an event, rules 212 for determining the best notification method to use when detecting an event, context information 213 that represents a user's current state, other database information 214 for storing other information such as e-mail or news, an information server 215 for allowing the various elements of the notification source 210 to interact with each other and with the network 216, and a mobile speech access module 217 for receiving and complying with voice commands to act in response to a notification. Any database may be used to store the rules 212, context information 213 and other database information 214 so long as there is a component (e.g., information server 215) by which this information may be accessed.

The information server 215 may be, for example, the Microsoft® Mobile Information Server Enterprise Edition (also called EE MIS). The network 216 may be, for example, the Internet. The notification source 210 and the delivery component 220 may each be implemented by a computing environment such as the computing environment illustrated in FIG. 1. The various elements included within the notification source 210 and the delivery component 220 may be, for example, one or more of the application programs 136 and/or other program modules 137 as they are executed by processing unit 121. The various elements of the delivery component 220 will be described as the method of FIG. 3 is described further below.

FIG. 3 is a flowchart of a method that may be performed by the notification source 210. The notification process is initiated by the detection of an event that requires a notification be dispatched to the user (act 301). Referring to FIG. 2, the notification service 211 may detect an event to which a user has previously subscribed. Such events are not limited to any particular events or classes of events. For example, the notification may be that a new e-mail from an important individual has been received in the user's in-box. The event may also be that a breaking news event or that a stock price has reached a predetermined value.

Then, the method includes a step for sending a notification to the user that is appropriate for the user's circumstances (step 302). This step for accomplishing this result may be accomplished by the corresponding acts illustrated as acts 303, 304, and 305. For example, the method may include an act of accessing a current context of the user (act 303) after detecting the event. Referring to FIG. 2, this may include the notification service 211 accessing the context information 213 via the information server 215. The current context may include, for example, whether or not the user's telephone is on, busy, in hands-free mode, out of range, in meeting mode or the like for each of the user's telephones. More regarding how the current context may be accurately and dynamically updated to reflect the user's current state will be described further below.

Then, the method includes identifying one of a plurality of possible notification methods to use in order to dispatch the notification based on the current context of the user (act 304). This may be accomplished, for example, by the notification service 211 accessing rules 212 via the information server 215. The rules 212 relate the current user circumstances with how and whether notification should occur given the current circumstances, and may be defined by default or by user designation.

There is an endless permutation of possible rules. As an illustrative example, the rules might define which telephonic devices to notify given the current time, and what notification methods to use if the current device is on or off, in hands-free mode or not, and busy or not. As a more specific example, the user may state that she wants to be notified by audible voice message if she receives an e-mail from a certain individual, except if she is already using the telephone through which the voice message was to be rendered, in which case the user may specify to be notified via a text message.

The method may then cause the notification to be dispatched to the user using the identified notification method (act 305). This may include the notification service 210 issuing a network message over the network 216 to a delivery component 220 that is to ultimately deliver the notification. Although FIG. 2 shows only one notification source, and only one delivery component, those of ordinary skill in the art will appreciate, after having reviewed this description, that the principles of the present invention may be scaled such that multiple notification sources communicate over the network 216 with multiple delivery components.

The delivery component 220 then delivers the notification using the appropriate notification method. In this description, the operation of the delivery component 220 to deliver via three specific notification methods (e.g., voice, SMS, and WAP text push notifications) will be described although those of ordinary skill in the art will appreciate, after having reviewed this description, that the principles of the present invention may extend to many other types of notification methods.

Suppose that the notification method is to be a voice notification. In this description and in the claims, a "voice" notification is defined as an audible rendering of information that is interpretable by a human. For example, a computerized reading of a text notification may be considered a voice notification under this definition.

The voice notification may be facilitated by the notification source 210 sending one or more network messages to the delivery component 220 via the network 216. The network message indicates the content of the notification as well as an indication that the notification is to be a voice notification. A notification proxy 222 receives the network message via an information server 221. The information server 221 may be, for example, the Microsoft® Mobile Information Server Carrier Edition (also called CE MIS).

The notification proxy 222 then causes the SS7 module 223 to interface via SS7 interface 224 with the Public Switched Telephone Network 231 (also called a "PSTN network"). The SS7 interfaces are a conventional interface typically maintained by carriers to control various aspects of a telephone network. For example, the SS7 module 223 may cause the SS7 interface 224 to establish a telephonic connection between the destination telephonic device (e.g., telephone 241, or mobile telephone 242) and the gateway 225 via the PSTN 231. The gateway 225 operates to convert sound data present on the telephone connection between the gateway 225 and the destination telephonic device to sound data of a form recognizable by various telephone services such as voice print module 226, text-to-speech conversion module 227, and speech recognition module 228.

The voice print module 226 may be used for authentication by interpreting voice patterns of words spoken by a telephone user (e.g., a user of telephone 241 or mobile telephone 242) to authenticate the user. The text-to-speech conversion module 227 converts text to speech. For example, in order to create an audible form of the notification, the notification proxy 222 provides the content of the notification in text form to the text-to-speech conversion module 227. In this description and in the claims, "text-to-speech" conversion is defined as any technology now existing, or to be developed in the future, that converts text into an audible reading of the text. One such technology involves the concatenation of digital audio files (e.g., .wav files), where each audio file represents a word or phrase. A speech recognition module 228 either directly recognizes the meaning of spoken words, or else converts the spoken words into text form.

The notification proxy 222 has access to each of these telephone services to facilitate the voice notification. For example, in order to authenticate the user, the notification proxy 222 may provide a text message to the text-to-speech conversion module 227 instructing the user to speak certain words. This text is then converted to speech information, which is audibly presented to the user over the established telephone connection between the gateway 225 and the destination telephonic device. The user may then respond by speaking the certain words. The notification proxy 222 causes the voice print module 226 to listen for the spoken words and to identify whether or not the voice print matches the voice print of the intended recipient of the notification. The voice print module 226 may then report the success or failure of the voice print authentication to the notification proxy 222. Thus, voice print authentication is possible.

Other forms of authentication may also be performed. For example, the speech recognition module 228 may be used to report a spoken PIN (i.e., a voice PIN) to the notification proxy 222. The gateway 225 may include a caller ID module to thereby support authentication using caller ID. In addition, the delivery component 220 may support touch-tone PIN (e.g., a DTMF pin) authentication. For example, the gateway 225 may have a Telephony Application Program Interface (TAPI) module that detects and reports concerning the receipt of DTMF tones. The delivery component 220 is not limited to such authentication methods.

It may also be that the notification requires no authentication at all. The level of authentication required may have a default setting. These default settings may be overridden should the rules 212 indicate that other authentication settings (or lack thereof) are appropriate for a given notification. The proper authentication method to be used for the associated notification may have been identified to the notification proxy 222 by the notification source 210.

Once any authentication is performed, the notification proxy 222 may pass the content of the notification in the form of text to the text-to-speech conversion module 227. The resulting voice information may then be presented, via the gateway 225, to the user over the established telephone connection. The user may then choose to perform certain actions in response to the voice notification.

For example, if a user received a notification that the user had a new e-mail from a certain sender in the user's in-box, the user may speak "more info" or something similar to obtain the full text of the e-mail. The voice data is then passed from the gateway 225 to the speech recognition module 228 for appropriate recognition. The notification proxy 222 then may inform the information server 215 of the selected action. The information server 215 may maintain session information for the notification and thus may associate the selected action with the appropriate notification. The information server 215 may then pass the selected action to the mobile speech access module 217 for appropriate processing. Such processing may include accessing other database information 214 as needed. For example, if the user receives notification of a new e-mail, the user may request the full text of the corresponding e-mail. The mobile speech access module 217 would access the appropriate e-mail from the other database information 214, and return the full-text back to the notification proxy 222, which would then be rendered over the telephone connection as previously described for the original notification.

The notification proxy 222 may also present a visual notification such as a text message to the user using a visual display associated with the telephone. This form of notification may also be identified within the network message supplied from the notification source 210 in cases where a visual notification is appropriate. The notification proxy 222 may then use a Short Message Service (also called "SMS") module 230 to send the text notification to the user via the SMS connector 229 over the mobile carrier network 232. Similarly, the notification proxy 222 may send the notification to the telephone using a Wireless Application Protocol (WAP) text push notification that includes structured format information such as, for example, Wireless Markup Language (WML) or HyperText Markup Language (HTML) documents.

The SMS or WAP notification may also include a list of actions to take in response to the notifications. The user may then select one of these actions. The selection may result in a corresponding message (e.g., an SMS message) to be returned to the notification proxy 222. The notification proxy then returns the selected action to the notification source 210 for appropriate processing by the notification source 210.

As previously mentioned, the notification service 211 accesses the context information 213 to determine the most appropriate way to notify the user using the rules 212. The context information 213 represents relevant state information about the user. The state information may include whether or not a particular user's telephone is on or off, busy, or in hands-free mode. An SS7 interface 224 is capable of detecting such context information and thus may report the same to the notification proxy 222. The notification proxy 222 may then report the context to the notification source 210 for storage in the context information 213. The mobile carrier network 232 may also detect which cellular region the user is in and may report the same to the delivery component 220 using, for example, an SMS message. The telephonic device may detect which mode the telephone is in (e.g., meeting mode, outside mode, normal mode, or the like), and report this status via SMS messages to the notification source 210 via the delivery component 220.

Thus, the present invention allows for individuals to be notified of events in a manner that is tailored to the current circumstances surrounding the user. The principles of the present invention also allow the user to act appropriately and conveniently on the notification.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network environment that includes a computing system comprising a notification mechanism configured to dispatch notifications over a network to a particular designated device in response to detected events, a method for the notification mechanism notifying a user of an event in a context sensitive manner, the method comprising the following:

an act of a computing system detecting an event which requires a notification be dispatched to a user at a particular designated device, wherein the notification is initially associated with textual information to be transmitted as part of the notification to the user at the particular designated device;

upon identifying the particular designated device to dispatch the notification to and upon detecting the event, an act of the computing system accessing a current context of the user corresponding to a user status at the particular designated device in order to determine whether the notification that includes the textual information associated with the event should be dispatched to the particular designated device in a text format or in an audible voice format;

an act of the computing system identifying a plurality of possible notification methods to use in order to dispatch the notification to the particular designated device, including a text notification method and an audible voice notification method;

the computing system determining, based on the current context of the user with the particular designated device, whether the notification should be dispatched to the particular designated device with the text notification method or the an audible voice notification method; and an act of the computing system causing the notification to be dispatched to the particular designated device of the user using the identified notification method, wherein if it is determined that the notification should be dispatched to the particular designated device with the audible voice notification method, based on the current context of the user, the method further including converting the textual information of the notification into an audible voice notification.

2. A method in accordance with claim 1, further comprising the following:

an act of supporting a plurality of response actions that may be desired in response to the notification.

3. A method in accordance with claim 2, further comprising the following:

an act of receiving a user-selection of at least one of the response actions.

4. A method in accordance with claim 3, wherein the act of receiving a user-selection of at least one of the response actions comprises the following:

an act of receiving a user-selection of at least one of the response actions, the user-selection being issued by the user in the same manner as the user received the notification.

5. A method in accordance with claim 1, wherein the act of identifying one of the plurality of possible notification methods comprises the following:

an act of identifying the visual notification method based on the current context of the user.

6. A method in accordance with claim 1, wherein the visual notification method includes a text notification method.

7. A method in accordance with claim 6, wherein the text notification method includes a notification method that uses text messages of limited size.

8. A method in accordance with claim 7, wherein the notification method that uses text messages of limited size includes a notification method that uses Short Message Service messages.

9. A method in accordance with claim 6, wherein the text notification method includes an instant messaging notification method.

10. A method in accordance with claim 6, wherein the text notification method comprises Wireless Application Protocol text push notification methods.

11. A method in accordance with claim 1, wherein the act of identifying one of a plurality of possible notification methods comprises the following:
    an act of accessing a set of rules that define what notification method to use given the current context of the user.

12. A method as recited in claim 1, wherein the event is a conditional event and, wherein the method further includes an act of causing an audible notification to be dispatched to the user using a telephone network.

13. A method in accordance with claim 12, wherein the act of causing an audible notification to be dispatched to the user using a telephone network comprises the following:
    an act of dispatching a text message to a telephone server, the text message including instructions to dispatch a voice message to the user.

14. A method in accordance with claim 13, further comprising the following:
    an act of the telephone server establishing a telephone connection between the user and telephone services.

15. A method in accordance with claim 14, wherein the telephone services include a voice print authentication service, wherein the method further comprises the following:
    an act of the telephone server receiving a voice print authentication from the user;
    an act of the telephone server authenticating the user as the intended recipient of the notification based on the voice print; and
    an act of dispatching an audible form of the notification to the user over the telephone connection.

16. A method in accordance with claim 14, wherein the telephone services include a text-to-speech conversion module, wherein the method further comprises the following:
    an act of the text-to-speech conversion module converting the text message into an audible notification; and
    an act of dispatching the audible notification to the user over the telephone connection.

17. A method as recited in claim 1, wherein the current context includes at least one of a busy and not busy status of the designated device.

18. A method as recited in claim 1, wherein the current context includes a hands free status of the designated device.

19. A method as recited in claim 1, wherein accessing the current context of the user corresponding to a user status at the particular designated device includes identifying a setting of the designated device from a plurality of possible settings, and wherein at least one of the plurality of possible settings includes an out of range mode of the designated device.

20. A computer program product comprising one or more computer-readable media having computer-executable instructions stored thereon for implementing the method recited in claim 1.

21. A computer program product in accordance with claim 20, wherein the one or more computer-readable media further have stored thereon the following:
    computer-executable instructions for supporting a plurality of response actions that may be desired in response to the notification.

22. A computer program product in accordance with claim 21, wherein the one or more computer-readable media further have stored thereon the following:
    computer-executable instructions for detecting the receipt of a user-selection of at least one of the response actions.

23. A computer program product in accordance with claim 20, wherein the computer-executable instructions for identifying one of a plurality of possible notification methods comprise the following:
    computer-executable instructions for accessing a set of rules that define what notification method to use given the current context of the user.

24. A computer program product in accordance with claim 20, wherein the one or more computer-readable media are physical storage media.

25. A computer program product as recited in claim 20, further comprising:
    computer-executable instructions for detecting a conditional event which requires a notification be dispatched to the user; and
    computer-executable instructions for causing an audible notification to be dispatched to the user using a telephone network.

26. A computer program product in accordance with claim 25, wherein the computer-executable instructions for causing an audible notification to be dispatched to the user using a telephone network comprise the following:
    computer-executable instructions for dispatching a text message to a delivery component, the text message including instructions to dispatch a voice message to the user.

27. A computer program product in accordance with claim 26, wherein the one or more computer-readable media are physical storage media.

28. In a network environment that includes a notification mechanism configured to dispatch notifications over a network to designated devices in response to detected events, a method for the notification mechanism notifying a user of an event in a context sensitive manner, the method comprising the following:
    an act of detecting an event which requires a notification be dispatched to the user at a designated device;
    upon identifying the designated device to dispatch the notification to and upon detecting the event, an act of accessing a current context of the user corresponding to a user status at the designated device;
    an act of identifying a plurality of possible notification methods to use in order to dispatch the notification to the designated device, and determining, based on the current context of the user with the designated device, which of the plurality of notification methods to use to provide the notification to the user at the designated device; and
    an act of causing the notification to be dispatched to the designated device of the user, only after first authenticating the user, and by using the identified notification method.

* * * * *